(12) United States Patent
Lee et al.

(10) Patent No.: US 9,119,254 B2
(45) Date of Patent: Aug. 25, 2015

(54) LIGHT EMITTING DEVICE POWER SUPPLY CIRCUIT WITH DIMMING FUNCTION AND CONTROL CIRCUIT THEREOF

(71) Applicants: Yi-Wei Lee, Taipei (TW); Isaac Y. Chen, Zhubei (TW); Tong-Cheng Jao, Taichung (TW); Chien-Yang Chen, Taipei (TW)

(72) Inventors: Yi-Wei Lee, Taipei (TW); Isaac Y. Chen, Zhubei (TW); Tong-Cheng Jao, Taichung (TW); Chien-Yang Chen, Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 14/567,825

(22) Filed: Dec. 11, 2014

(65) Prior Publication Data

US 2015/0173145 A1    Jun. 18, 2015

Related U.S. Application Data

(60) Provisional application No. 61/916,755, filed on Dec. 16, 2013.

(51) Int. Cl.
*H05B 33/08* (2006.01)

(52) U.S. Cl.
CPC ........ *H05B 33/0815* (2013.01); *H05B 33/0845* (2013.01)

(58) Field of Classification Search
USPC ........ 315/307, 308, 276, 277, 278, 282, 224, 315/219
See application file for complete search history.

(56) References Cited

U.S. PATENT DOCUMENTS

| | | | |
|---|---|---|---|
| 8,193,738 B2 * | 6/2012 | Chu et al. | 315/307 |
| 8,278,832 B2 * | 10/2012 | Hung et al. | 315/219 |
| 8,456,108 B2 * | 6/2013 | Kimura et al. | 315/307 |

* cited by examiner

*Primary Examiner* — David H Vu
(74) *Attorney, Agent, or Firm* — Tung & Associates

(57) ABSTRACT

The present invention provides a light emitting device power supply circuit with dimming function and a control circuit thereof. The light emitting device power supply circuit includes: a phase-cut dimming circuit, a rectifier circuit, a transformer circuit, and a control circuit. The transformer circuit includes an auxiliary winding, which is coupled to a primary winding, for generating a bleeder current to keep a conduction current higher than a holding current and prevent the phase-cut dimming circuit from turning OFF when the phase-cut dimming circuit operates in conductive phase. The control circuit includes a waveform analysis circuit, a bleeder current control circuit, and a bleeder current source. The bleeder current source includes a linear regulator or a variable current source. The bleeder current source controls the bleeder current so that the bleeder current is generated in a continuous and non-switching manner within the conductive phase.

12 Claims, 12 Drawing Sheets

US 9,119,254 B2

LIGHT EMITTING DEVICE POWER SUPPLY CIRCUIT WITH DIMMING FUNCTION AND CONTROL CIRCUIT THEREOF

CROSS REFERENCE

The present invention claims priority to U.S. provisional application No. 61/916,755, filed on Dec. 16, 2013.

BACKGROUND OF THE INVENTION

1. Field of Invention

The present invention relates to a light emitting device power supply circuit with dimming function and a control circuit thereof. Particularly, it relates to such a light emitting device power supply circuit which conducts a bleeder current according to the conductive phase of an AC dimming voltage to avoid flicker of a light emitting device circuit, and a control circuit thereof.

2. Description of Related Art

FIG. 1A shows a schematic diagram of a prior art light emitting diode (LED) power supply circuit 100. As shown in FIG. 1A, the LED power supply circuit 100 includes a tri-electrode AC switch (TRIAC) dimming circuit 12, a rectifier circuit 14, and an LED driver circuit 16. The TRIAC dimming circuit 12 receives an AC voltage. When the AC voltage exceeds a predetermined trigger phase, the TRIAC dimming circuit 12 fires (starts-up) and is turned ON. FIG. 1B shows a schematic diagram of waveforms of the AC voltage and an AC dimming voltage generated by the TRIAC dimming circuit 12. The AC voltage is shown by a dashed line, and the AC dimming voltage generated by the TRIAC dimming circuit 12 is shown by a solid line. The rectifier circuit 14 receives the AC dimming voltage, and rectifies it to generate an input voltage Vin and an input current Iin which are inputted to the LED driver circuit 16. The LED driver circuit 16 converts the input voltage Vin to an output voltage Vout, and provides an output current to the LED circuit 11, for driving the LED circuit 11 and adjusting its brightness. In the aforementioned circuit, the TRIAC dimming circuit 12 is provided for determining a trigger phase of the AC dimming voltage to adjust an average brightness of the LED circuit 11. The LED driver circuit 16 includes a power stage circuit which has at least one power switch. The power stage circuit may be a synchronous or asynchronous buck, boost, inverting, buck-boost, inverting-boost, or flyback power stage circuit as shown in FIGS. 2A-2K.

One of the problems that the aforementioned prior art faces is that the TRIAC dimming circuit 12 includes a TRIAC device; the TRIAC device requires a large latching current to fire (start-up), but after the LED circuit 11 is turned ON, a holding current flowing through the TRIAC device is relatively lower. If what the power supply drives is a high power consuming load circuit, such as a conventional incandescent lamp, the latching current for the TRIAC device is sufficient because the conventional incandescent lamp consumes high current. However if what the power supply drives is a low power consuming load circuit, such as the LED circuit 11, the latching current for the TRIAC device is insufficient because of the low current consumption of the LED circuit 11. If the power supply circuit does not generate a sufficient latching current to fire the TRIAC device, a so-called "misfire" occurs and the LED circuit 11 will flicker perceptibly. FIG. 1C shows the waveforms of the AC voltage and the AC dimming voltage when the misfire condition occurs. On the other hand, even though the latching current is sufficient to fire the TRIAC device, a misfire may still occur if the output current Iout is too low and a current flowing through the TRIAC dimming circuit 12 is lower than the holding current, which may happen when the trigger phase is too late.

FIGS. 3A-3C show schematic diagrams of another prior art LED power supply circuit 110, which intends to solve the misfire problem of the aforementioned prior art. Different from the prior art LED power supply circuit 100 shown in FIG. 1A, the prior art LED power supply circuit 110 as shown in FIG. 3A further includes a bleeder circuit 18 in additional to the TRIAC dimmer circuit 12, the rectifier circuit 14, and the LED driver circuit 16. The bleeder circuit 18 is coupled between the rectifier circuit 14 and the LED driver circuit 16, for generating a sufficient latching current periodically to trigger the TRIAC device in the TRIAC dimmer circuit 12. After the TRIAC device is triggered, the latching current generated by the bleeder circuit 18 is consumed by a loop connected to ground. FIG. 3B shows a specific embodiment of the LED power supply circuit 110 including the bleeder circuit 18.

More specifically, the bleeder circuit 18 includes resistors R1 and R2, which are connected in series between two output nodes of the rectifier circuit 14. A divided voltage across the resistor R2 turns ON a switch Q1, which generates the latching current for the TRIAC device. A resistor R3 and Zener diodes ZD1 and ZD2 are connected in series; after the switch Q1 is turned ON, a divided voltage at the node between the resistor R3 and the Zener diode ZD1 turns ON the switch Q2, such that a holding current is generated and flows through a resistor R4. The waveforms of the AC voltage and the AC dimming voltage are shown in FIG. 3C.

Even though the prior art LED power supply circuit 110 shown in FIGS. 3A and 3B mitigates the LED flicker issue caused by the misfire of the TRIAC device, this prior art has a drawback that the TRIAC device in the TRIAC dimmer circuit 12 can not be triggered in all period. More specifically, for the bleeder circuit 18 to generate the latching current to trigger the TRIAC device, the rectified dimming signal generated by the rectifier circuit 14 at the rectified node VD must be higher than a certain level such that the divided voltage across the resistor R2 is higher than the threshold voltage of the switch Q1. If a user intends to turn low the brightness of the LED circuit 11 to an extent that the rectified dimming voltage is too low, i.e., if the conductive phase of the rectified dimming signal in FIG. 3C is too short such that the trigger phase is too close to the end of the period of the phase-cut AC dimming signal (referring to FIG. 3C), the divided voltage across the resistor R2 will be lower than the threshold voltage of the switch Q1, and the TRIAC device can not be triggered because no latching current is generated. In other words, in this prior art which uses the bleeder circuit 18, a user can not use the TRIAC dimmer circuit 12 to adjust the brightness of the LED circuit 11 in full range (the TRIAC device in the TRIAC dimmer circuit 12 can not be triggered in all period), and there is a limit to the latest timing of the trigger phase. Furthermore, in certain applications it is not necessary to provide the dimming function and therefore the TRIAC dimmer circuit 12 is not required, but in this prior art, even though there is no TRIAC dimmer circuit 12, the bleeder circuit 18 still generates current and consumes power which is completely wasted.

U.S. patent application US 2012/0319621 A1 provides a TRIAC dimming system, which includes a driver circuit having a flyback power stage circuit. This TRIAC dimming system operates a switch by a pulse width modulation (PWM) signal according to a level of the AC dimming voltage to control an auxiliary winding to generate the bleeder current. However, this prior art includes a switch which keeps switching, and the switching of the switch causes electromagnetic interferences an relatively higher noises.

In view of the foregoing, the present invention provides a light emitting device power supply circuit with dimming function and a control circuit thereof. Particularly, it relates to such a light emitting device power supply circuit and control circuit thereof, in which a bleeder current is generated according to the conductive phase of an AC dimming voltage to avoid flicker of a light emitting device circuit.

SUMMARY OF THE INVENTION

From one perspective, the present invention provides a light emitting device power supply circuit with dimming function, including: a phase-cut dimming circuit, for converting an AC voltage to an AC dimming voltage, wherein the AC dimming voltage has a non-conductive phase and a conductive phase; a rectifier circuit, which is coupled to the phase-cut dimming circuit, for generating a rectified dimming voltage according to the AC dimming voltage; a transformer circuit, which is coupled to the rectifier circuit, including: a primary winding, which is connected to the rectifier circuit and a power switch in series, for receiving the rectified dimming voltage, wherein a primary current flowing through the primary winding is determined according to an operation of the power switch; a secondary winding, which is coupled to the primary winding, for providing an output current to a light emitting device circuit according to the primary current; and an auxiliary winding, which is coupled to the primary winding, for generating a bleeder current to keep a conduction current flowing through the phase-cut dimming circuit to be higher than a holding current of the phase-cut dimming circuit so as to prevent the phase-cut dimming circuit from turning OFF when the phase-cut dimming circuit operates in the conductive phase; and a control circuit, which includes: a waveform analysis circuit, which is coupled to the rectifier circuit, for generating a phase detection signal according to the rectified dimming voltage; a bleeder current control circuit, which is coupled to the waveform analysis circuit, for generating a determination signal according to the phase detection signal, wherein the determination signal is not a pulse width modulation (PWM) signal; and a bleeder current source, which is coupled to the bleeder current control circuit, for controlling the bleeder current according to the determination signal so that the bleeder current is generated in a continuous and non-switching manner within the conductive phase, wherein the bleeder current source includes a linear regulator or a variable current source.

From another perspective, the present invention provides a control circuit of a light emitting device power supply circuit with dimming function, wherein the light emitting device power supply circuit includes a phase-cut dimming circuit, for converting an AC voltage to an AC dimming voltage, wherein the AC dimming voltage has a non-conductive phase and a conductive phase; a rectifier circuit, which is coupled to the phase-cut dimming circuit, for generating a rectified dimming voltage according to the AC dimming voltage; a transformer circuit, which is coupled to the rectifier circuit, including: a primary winding, which is connected to the rectifier circuit and a power switch in series, for receiving the rectified dimming voltage, and determining a primary current flowing through the primary winding according to an operation of the power switch; a secondary winding, which is coupled to the primary winding, for providing an output current to a light emitting device circuit according to the primary current; and an auxiliary winding, which is coupled to the primary winding, for generating a bleeder current to keep a conduction current flowing through the phase-cut dimming circuit to be higher than a holding current of the phase-cut dimming circuit so as to prevent the phase-cut dimming circuit from turning OFF when the phase-cut dimming circuit operates in the conductive phase; the control circuit including: a waveform analysis circuit, which is coupled to the rectifier circuit, for generating a phase detection signal according to the rectified dimming voltage; a bleeder current control circuit, which is coupled to the waveform analysis circuit, for generating a determination signal according to the phase detection signal, wherein the determination signal is not a pulse width modulation (PWM) signal; and a bleeder current source, which is coupled to the bleeder current control circuit, for controlling the bleeder current according to the determination signal so that the bleeder current is generated in a continuous and non-switching manner within the conductive phase, wherein the bleeder current source includes a linear regulator or a variable current source.

In one preferable embodiment, the control circuit further includes an initial bleeder resistor, which is coupled to the bleeder current control circuit, for determining an initial bleeder current level.

In one preferable embodiment, the variable current source includes a current mirror.

In one preferable embodiment, the bleeder current is sourced a power supply voltage of the control circuit or the auxiliary winding.

In one preferable embodiment, the bleeder current source adjusts a level of the bleeder current in the conductive phase according to the determination signal.

In one preferable embodiment, the waveform analysis circuit determines whether a misfire condition occurs according to the rectified dimming voltage, and the bleeder current source adjusts a level of the bleeder current in the conductive phase according to the phase detection signal.

The objectives, technical details, features, and effects of the present invention will be better understood with regard to the detailed description of the embodiments below.

DESCRIPTION OF THE PREFERRED EMBODIMENTS

Figure 1A:
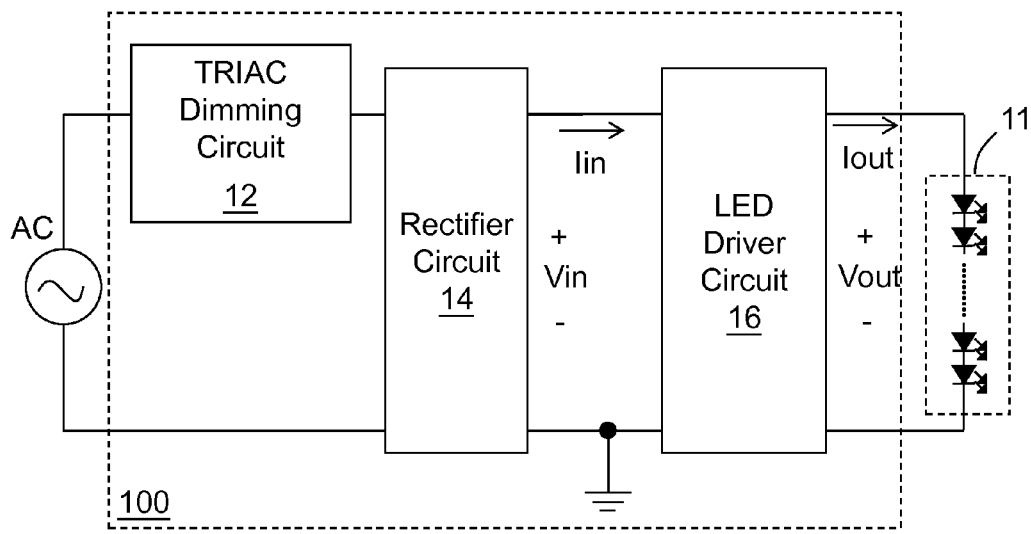
FIG. 1A shows a schematic diagram of a prior art light emitting diode (LED) power supply circuit 100.
Figure 1B:
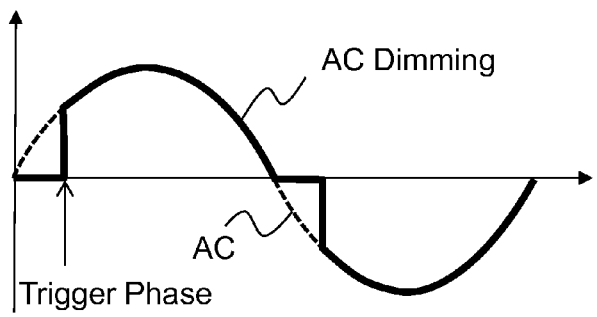
FIGS. 1B and 1C show waveforms of the AC dimming voltages with sufficient and insufficient latching current for firing the TRIAC device, respectively.
Figure 1C:
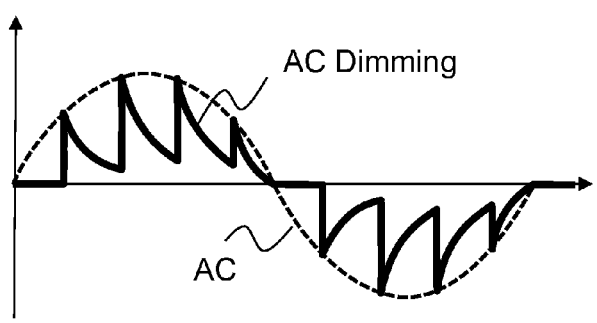
Figure 2A:
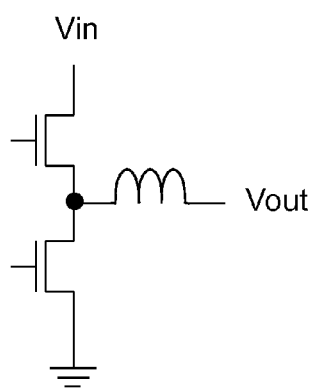
FIGS. 2A-2K show synchronous and asynchronous buck, boost, inverting, buck-boost, inverting-boost, and flyback power stage circuits.
Figure 2B:
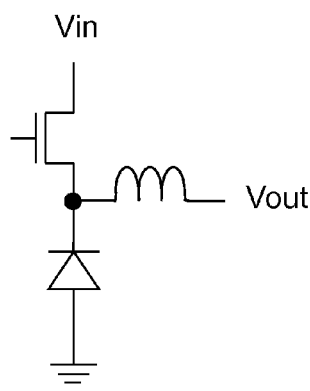
Figure 2C:
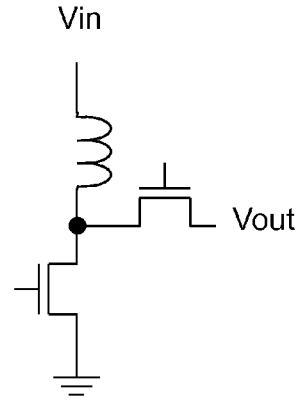
Figure 2D:
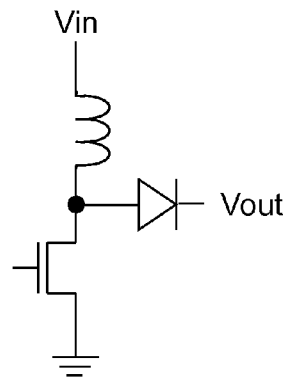
Figure 2E:
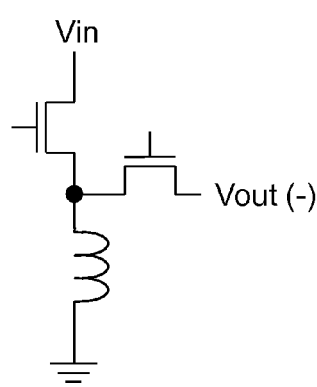
Figure 2F:
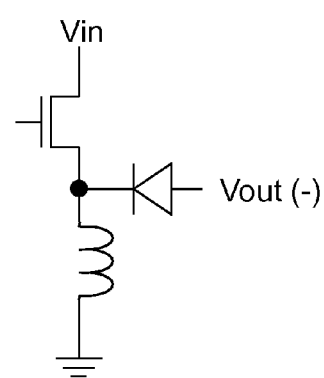
Figure 2G:
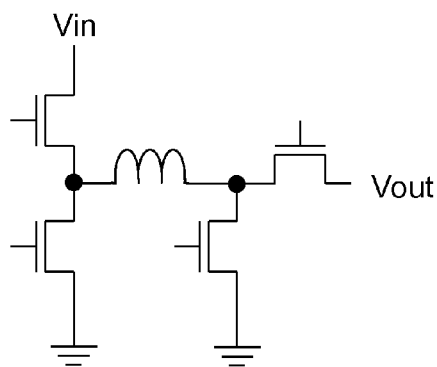
Figure 2H:
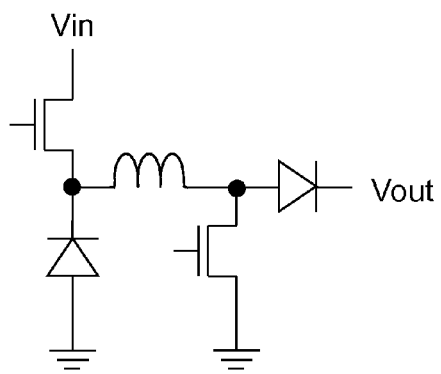
Figure 2I:
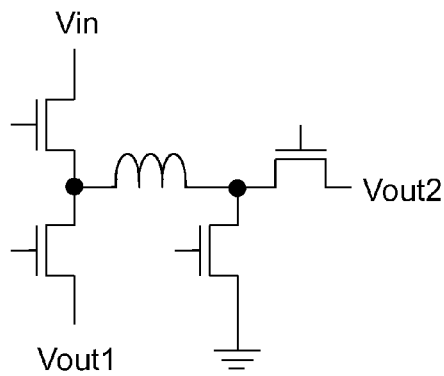
Figure 2J:
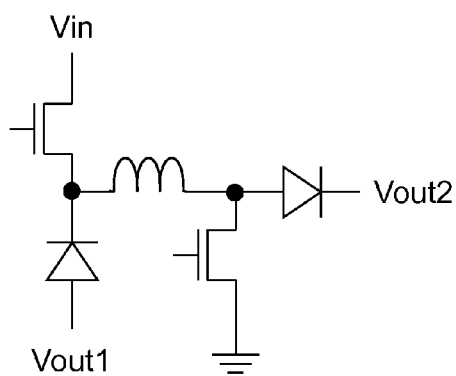
Figure 2K:
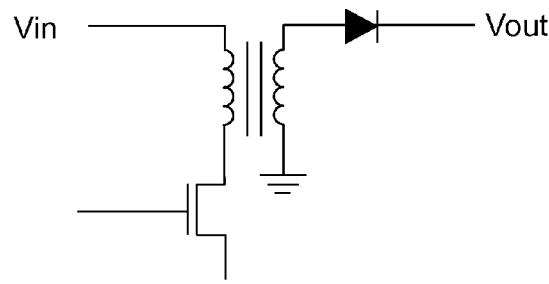
Figure 3A:
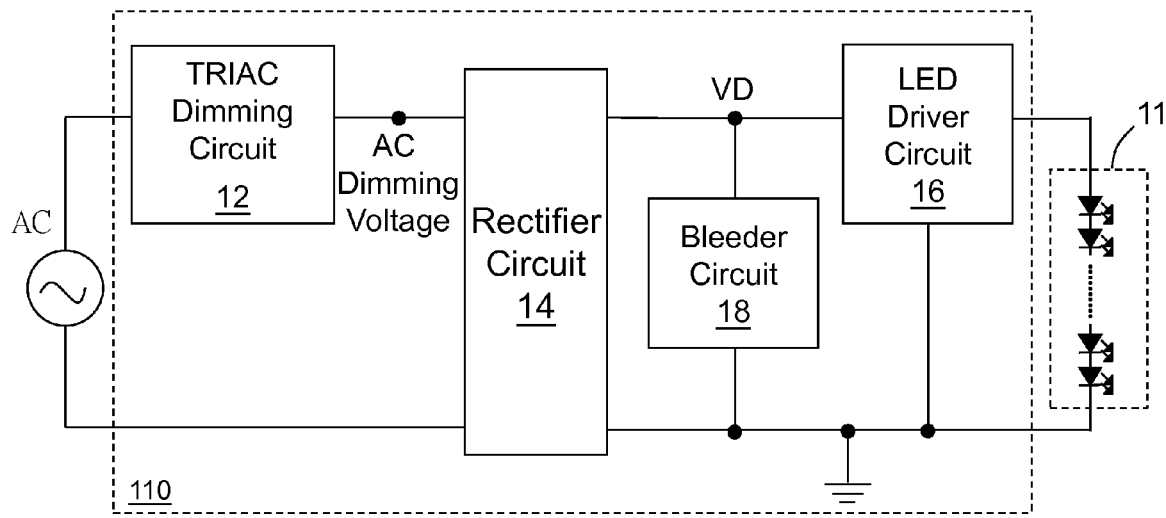
FIGS. 3A-3C show schematic diagrams and a waveform of the AC dimming voltage of another prior art LED power supply circuit 110.
Figure 3B:
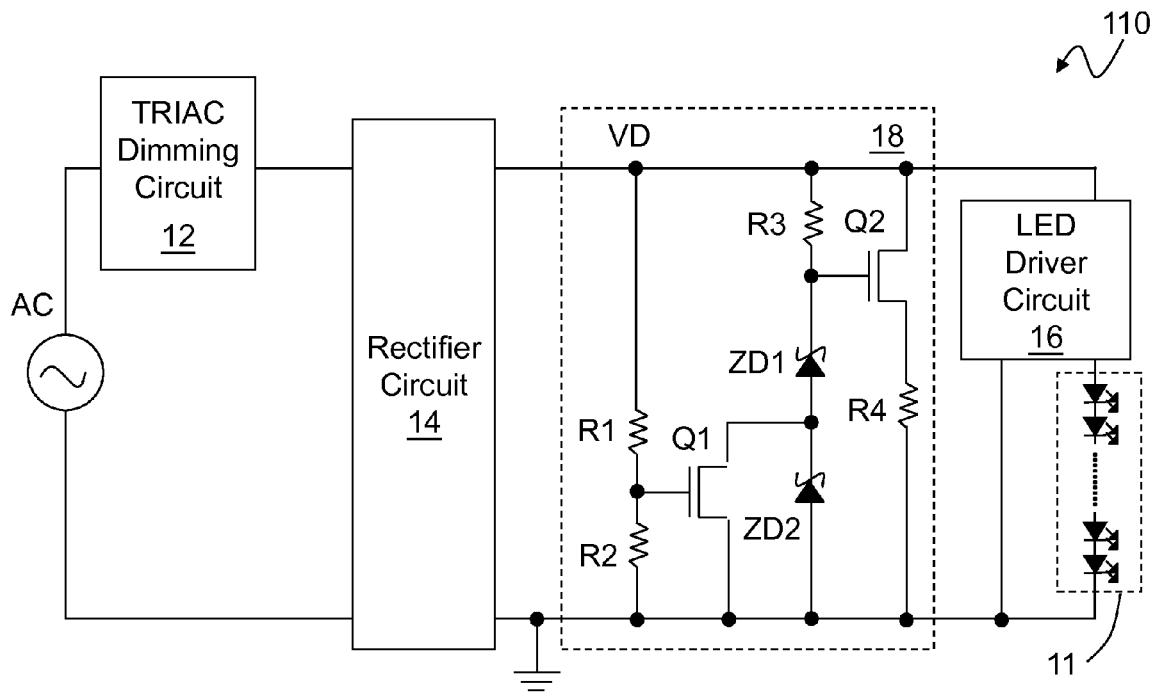
Figure 3C:
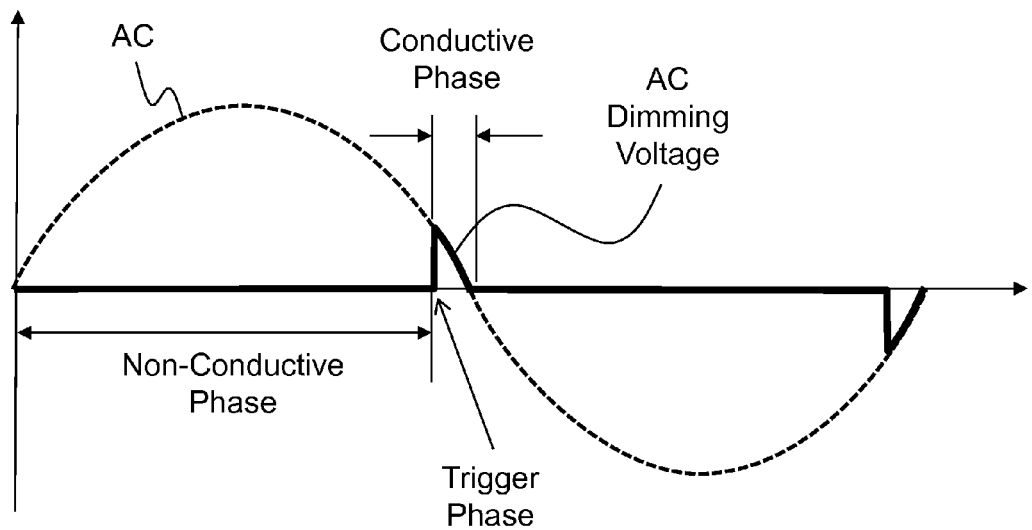
Figure 4:
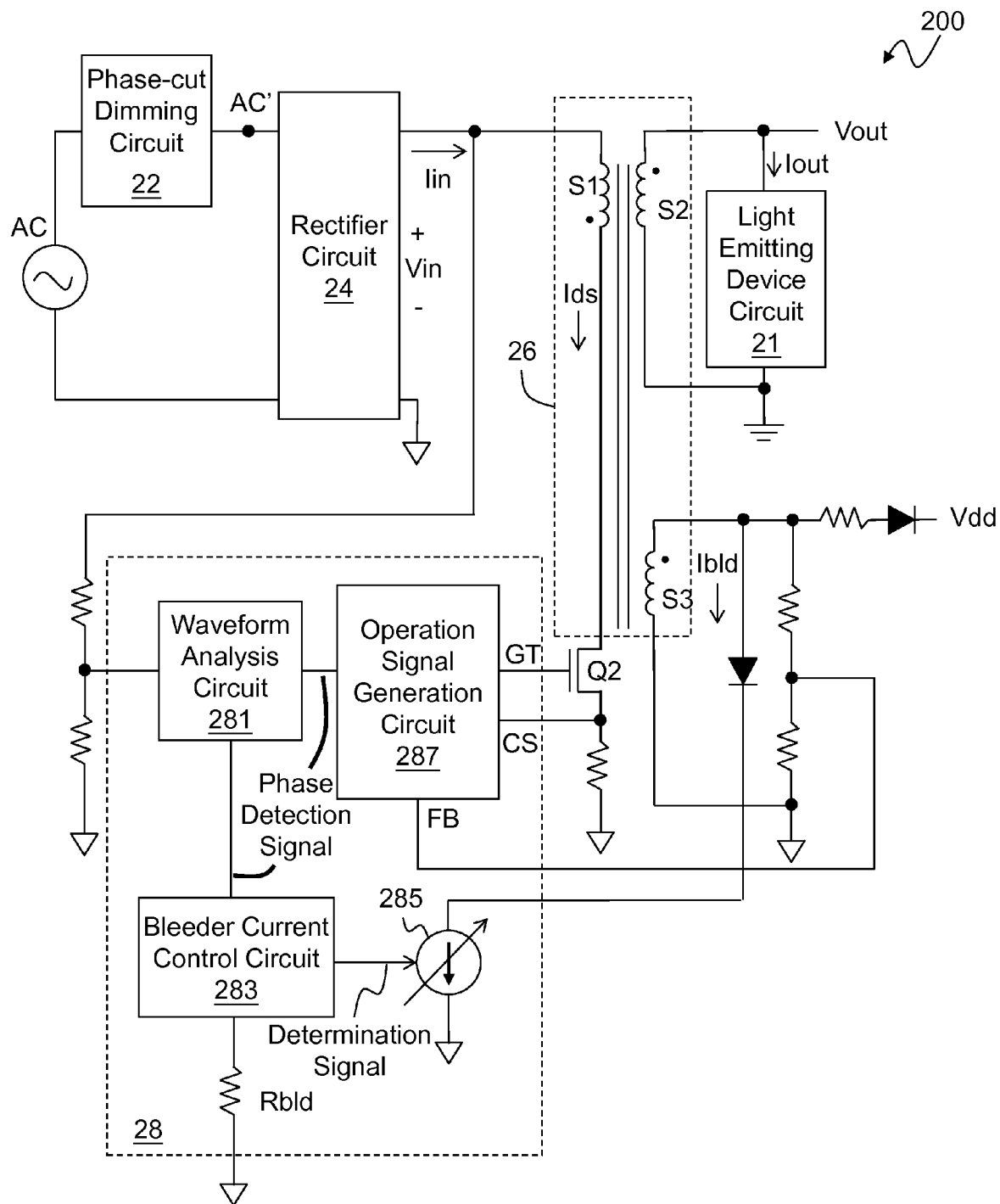
FIG. 4 shows a first embodiment of the present invention.

FIG. 4 shows a first embodiment of the present invention. As shown in the figure, a light emitting device power supply circuit 200 with dimming function includes a phase-cut dimming circuit 22, a rectifier circuit 24, a transformer circuit 26, and a control circuit 28. The phase-cut circuit 22 converts an AC voltage AC to an AC dimming voltage AC', wherein the AC dimming voltage AC' has a non-conductive phase and a conductive phase. Please refer to FIG. 3C for the conductive phase and the non-conductive phase. In FIG. 3C, a part of the AC dimming voltage AC' with non-zero voltage is the conductive phase, and the other part of the AC dimming voltage AC' with zero voltage is the non-conductive phase. The phase-cut dimming circuit 22 is for example but not limited to a tri-electrode AC switch (TRIAC) dimming circuit, which adjusts the brightness of the light emitting device circuit 21 by adjusting a ratio between the conductive phase and the non-conductive phase. The rectifier circuit 24 is coupled to the phase-cut dimming circuit 22 for generating a rectified dimming voltage Vin. The rectifier circuit 24 is for example but not limited to a bridge rectifier circuit, and optionally with a low-pass filter (LPF) circuit or a power factor correction (PFC) circuit, as well known by those skilled in the art, so details thereof are omitted here. In this embodiment, the present invention has flyback power conversion structure including a flyback power stage circuit. A transformer circuit 26 is coupled to the rectifier circuit 24, which includes a primary winding S1, a secondary winding S2, and an auxiliary winding S3. The primary winding S1 is connected to the rectifier circuit 24 and a power switch Q2 in series, for receiving the rectified dimming voltage Vin, and the operation of the power switch Q2 determines a primary current Ids flowing through the primary winding S1. The secondary winding S2 is coupled to the primary winding S1, for providing an output current Iout to the light emitting device circuit 21 according to the primary current Ids. The light emitting device circuit 21 includes for example but not limited to a single LED, a single LED string, or an LED array consisting of plural LED strings connected in parallel. The auxiliary winding S3 is coupled to the primary winding S1, for generating a bleeder current Ibld to keep a conduction current flowing through the phase-cut dimming circuit 22 higher than the holding current and thus preventing the phase-cut dimming circuit 22 from turning OFF when the phase-cut dimming circuit 22 operates in the conductive phase. In one embodiment, the phase-cut dimming circuit 22 is for example but not limited to the TRIAC dimming circuit, and the conduction current is a current flowing through the TRIAC device of the TRIAC dimming circuit. The conduction current needs to be maintained at a level higher than the holding current; otherwise the phase-cut dimming circuit 22 will keep turning OFF and firing to cause flicker of the light emitting device circuit 21.

The control circuit 28 includes: a waveform analysis circuit 281, a bleeder current control circuit 283, a bleeder current source 285, an operation signal generation circuit 287, and a resistor Rbld. The waveform analysis circuit 281 is coupled to the rectifier circuit 24, for generating a phase detection signal according to the rectified dimming voltage Vin. The resistor Rbld is coupled to the bleeder current control circuit 283, for determining an initial bleeder current level. The bleeder current control circuit 283 is coupled to the waveform analysis circuit 281, for generating a determination signal according to the phase detection signal, wherein the determination signal is not a pulse width modulation (PWM) signal. The bleeder current source 285 is coupled to the bleeder current control circuit 283, for controlling the bleeder current Ibld so that the bleeder current Ibld is generated in a continuous and non-switching manner within the conductive phase, wherein the bleeder current source 285 is for example but not limited to a linear regulator or a variable current source. The phase detection signal indicates the trigger phase. By detecting the trigger phase of the AC dimming voltage AC', it can be determined as to whether the bleeder current Ibld is required to be generated. The bleeder current control circuit 283 generates the determination signal, wherein the determination signal is for example maintained at a fixed voltage within the conductive phase, such that the bleeder current source 285 maintains conductive within the conductive phase, and keeps generating the bleeder current Ibld. The present invention is different from the prior art in that, the determination signal of the present invention is not a PWM signal, and there is no switch which keeps switching within the conductive phase, so the present invention does not have problems such as the EMI and noises in the prior art.

The operation signal generation circuit 287 is coupled to the waveform analysis circuit 281, for generating an operation signal GT according to a current sense signal, a feedback signal FB and the phase detection signal, to operate the power switch Q2 so as to determine the primary current Ids.

Figure 5:
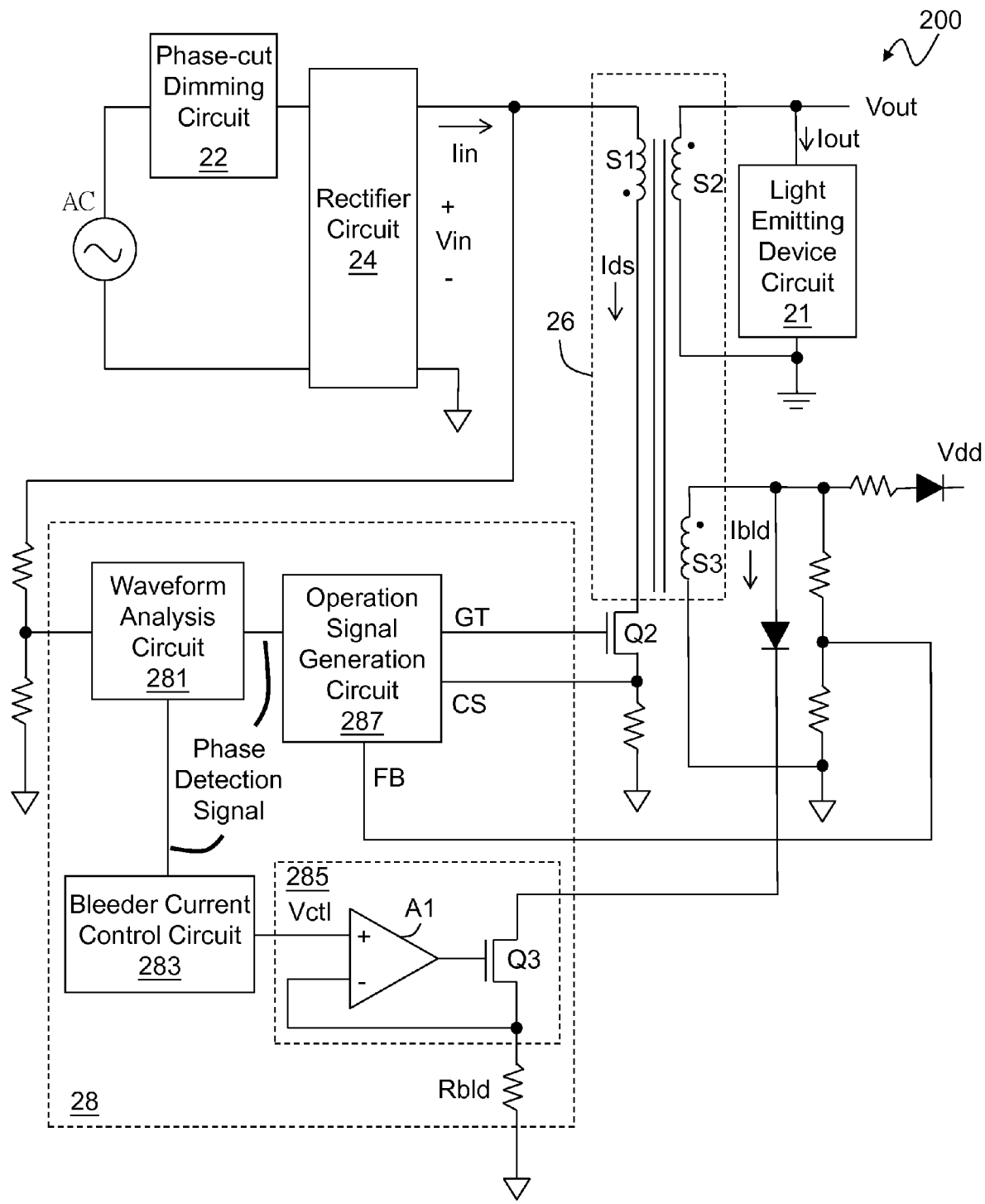
FIG. 5 shows a second embodiment of the present invention.

FIG. 5 shows a second embodiment of the present invention. This embodiment shows a more specific embodiment of the bleeder current source 285. As shown in FIG. 5, the bleeder current source 285 for example includes a linear regulator, which includes an error amplifier A1 and a transistor Q3. The bleeder current source 285 controls the bleeder current Ibld according to a determination signal Vctl and the resistor Rbld for determining the initial bleeder current level.

Figure 6:
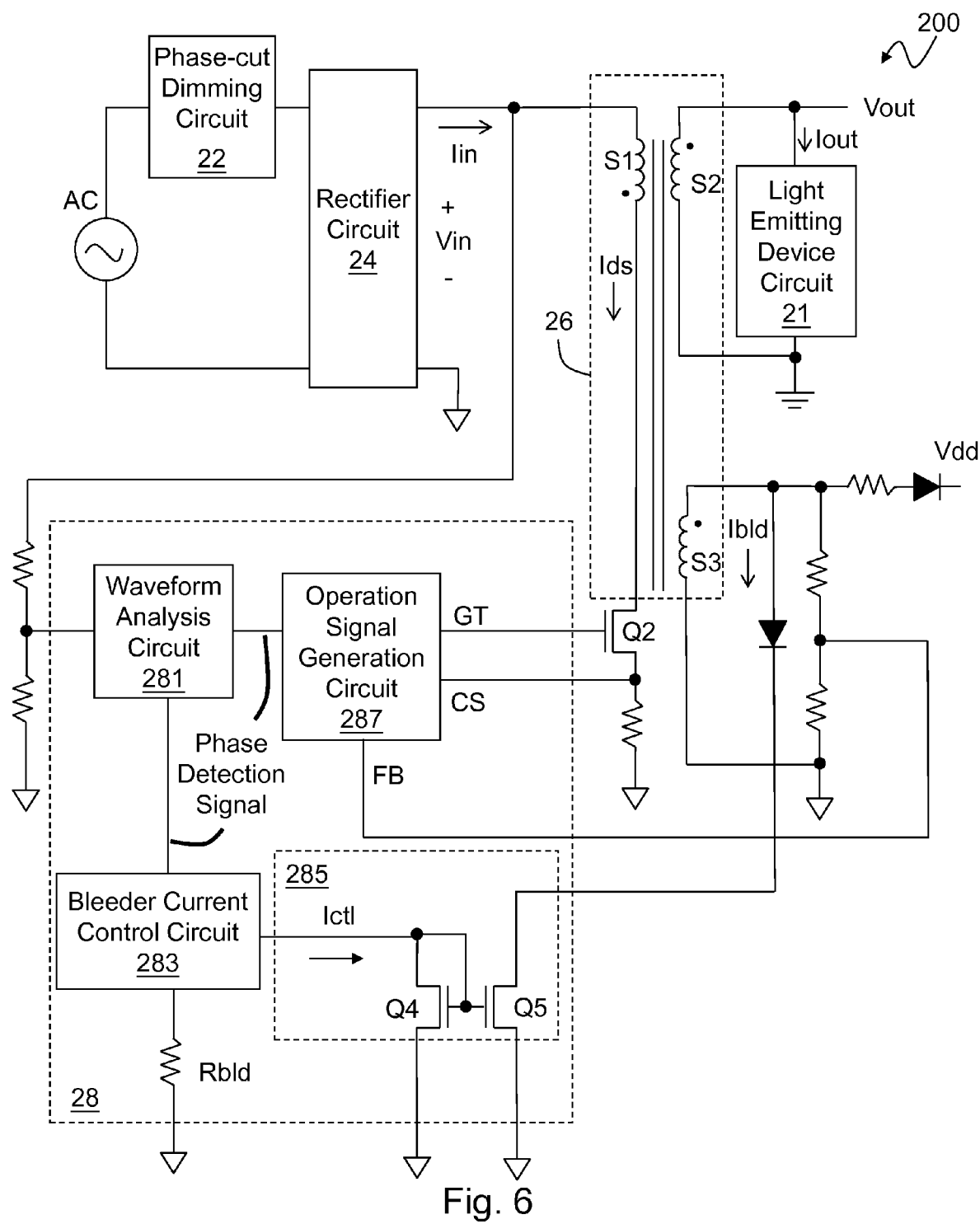
FIG. 6 shows a third embodiment of the present invention.

FIG. 6 shows a third embodiment of the present invention. This embodiment shows a more specific embodiment of the bleeder current source 285. As shown in the figure, the bleeder current source 285 for example includes a current mirror, which has transistors Q4 and Q5 as shown in the figure. The bleeder current source 285 controls the bleeder current Ibld according to a determination signal Ictl. The resistor Rbld is optional and for example provides a parameter setting function.

Figure 7:
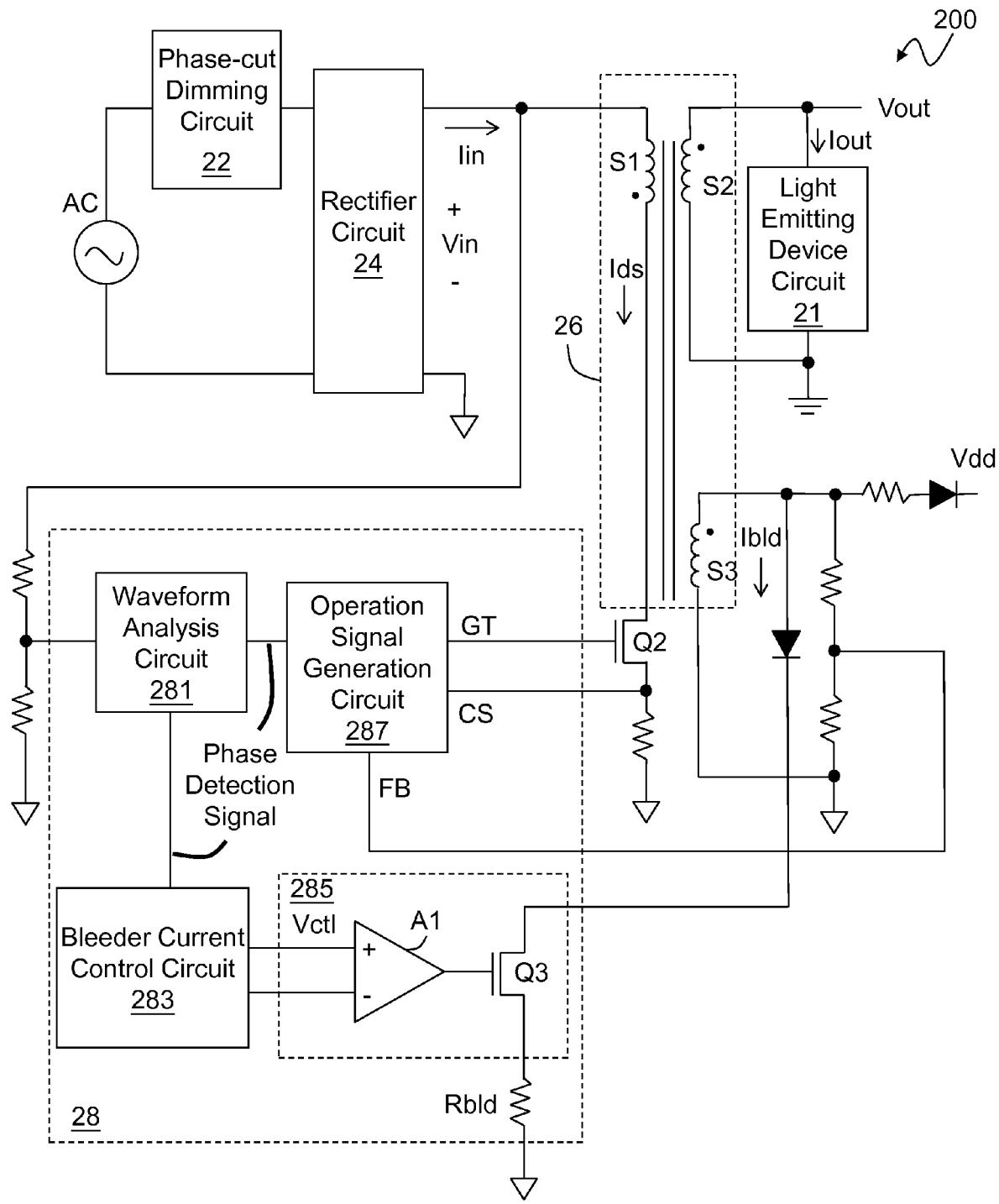
FIG. 7 shows a fourth embodiment of the present invention.

FIG. 7 shows a fourth embodiment of the present invention. This embodiment shows a more specific embodiment of the bleeder current source 285. As shown in the figure, the bleeder current source 285 for example includes the error amplifier A1 and the transistor Q3 as shown in the figure. This embodiment is different from the second embodiment in that, in this embodiment, the error amplifier A1 is open-loop controlled, but in the second embodiment, the error amplifier A1 is close-loop controlled.

Figure 8:
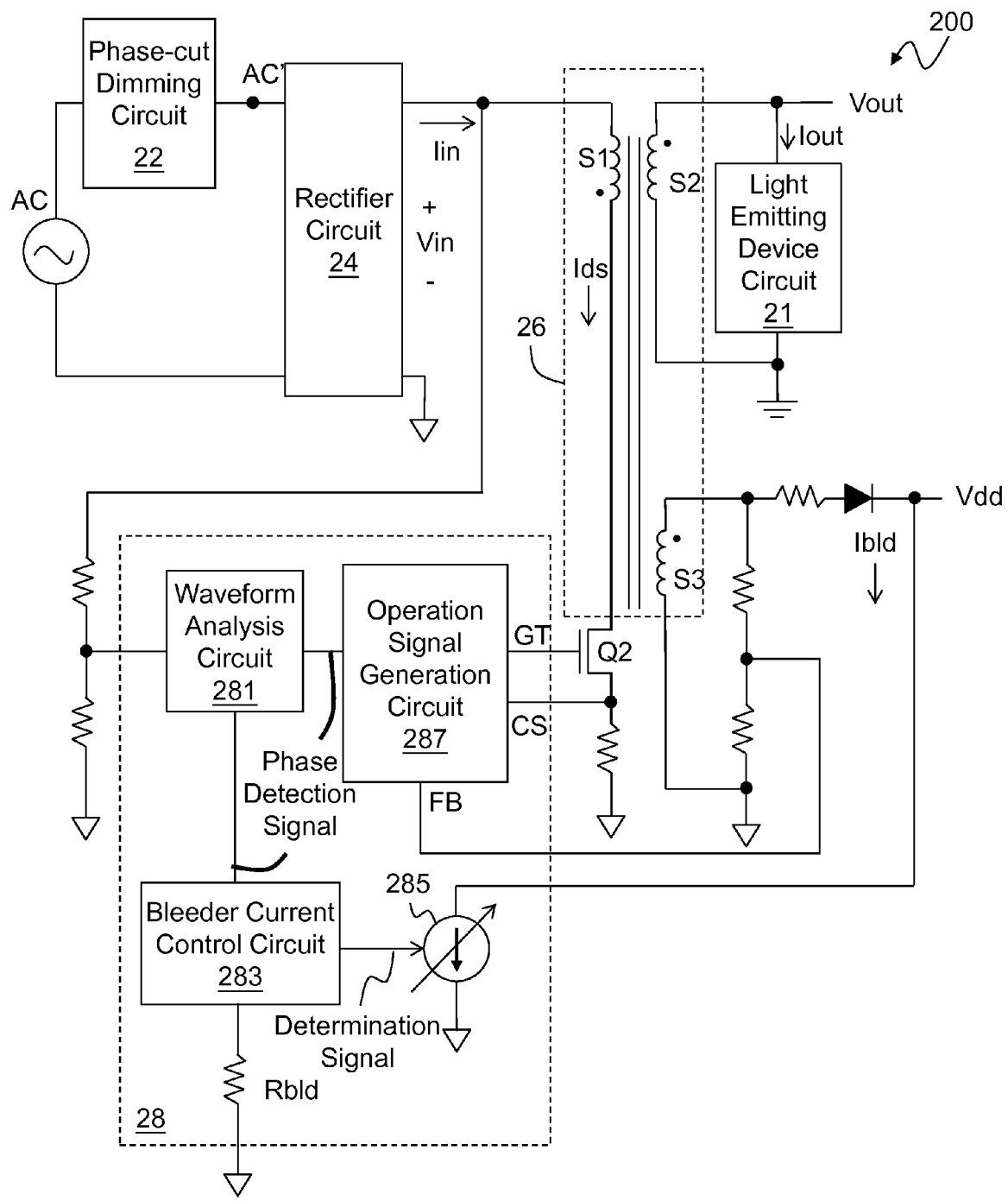
FIG. 8 shows a fifth embodiment of the present invention.

FIG. 8 shows a fifth embodiment of the present invention. This embodiment shows that the bleeder current Ibld is sourced from a power supply voltage Vdd (which is the operation power supply of the control circuit 28 in this embodiment) rather than directly from the auxiliary winding S3 as in the first to fourth embodiments. Although the power supply voltage Vdd is generated from the auxiliary winding S3, that the bleeder current Ibld is sourced from a different node provides an advantage over the first to fourth embodiments that, in this embodiment, at least a diode device can be omitted.

Figure 9:
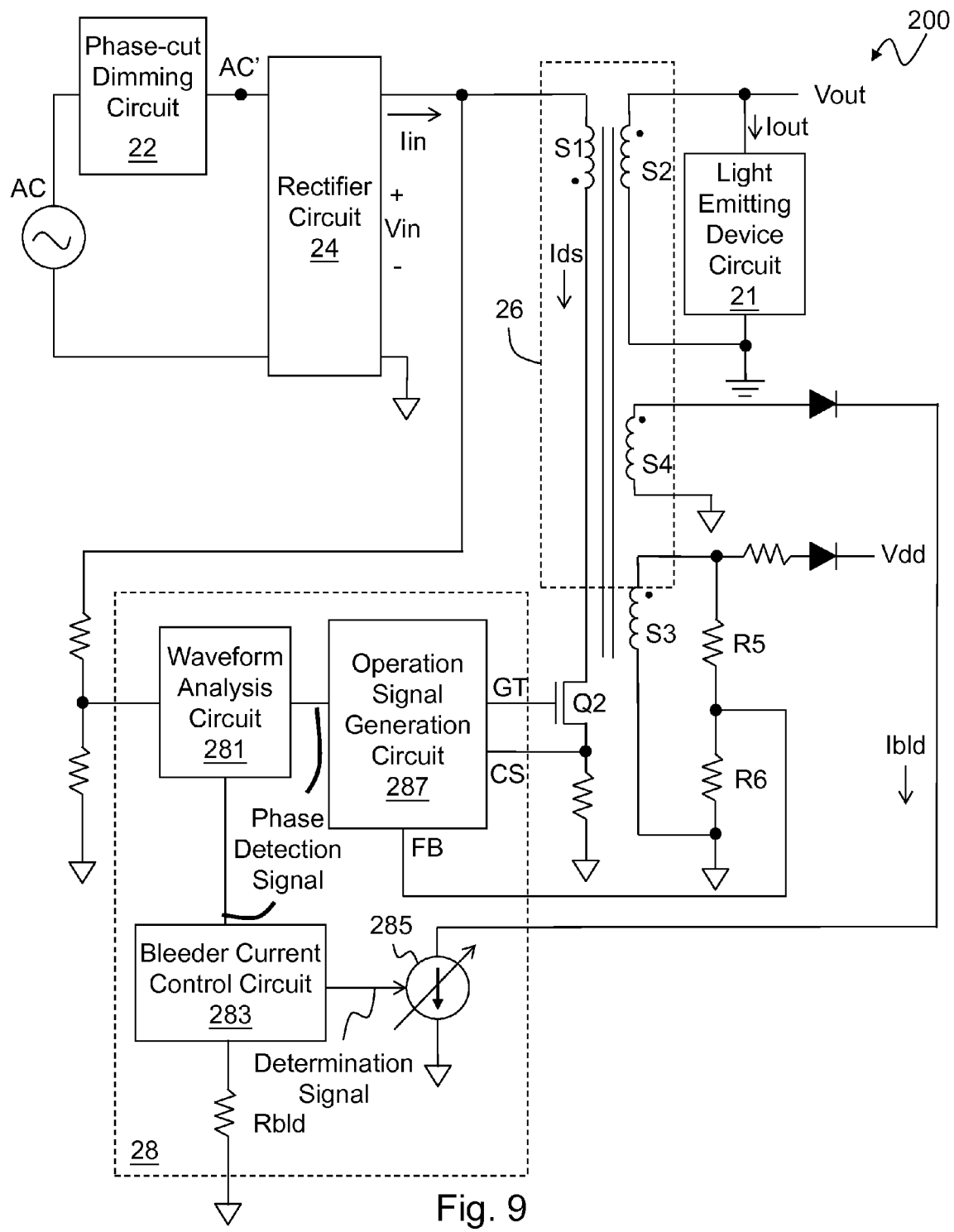
FIG. 9 shows a sixth embodiment of the present invention.

FIG. 9 shows a sixth embodiment of the present invention. This embodiment shows that the bleeder current Ibld is generated through an independent winding S4 rather than the auxiliary winding S3 as shown in the first to fifth embodiments. In this embodiment, the auxiliary winding S3 is coupled to resistors R5 and R6 connected in series for forming a divider circuit to provide the feedback signal FB, but the bleeder current Ibld is not generated through the auxiliary winding S3. This embodiment is advantageous in that, in this embodiment, a turn ratio between the independent winding S4 and the primary winding S1 can be determined according to the bleeder current Ibld.

Figure 10:
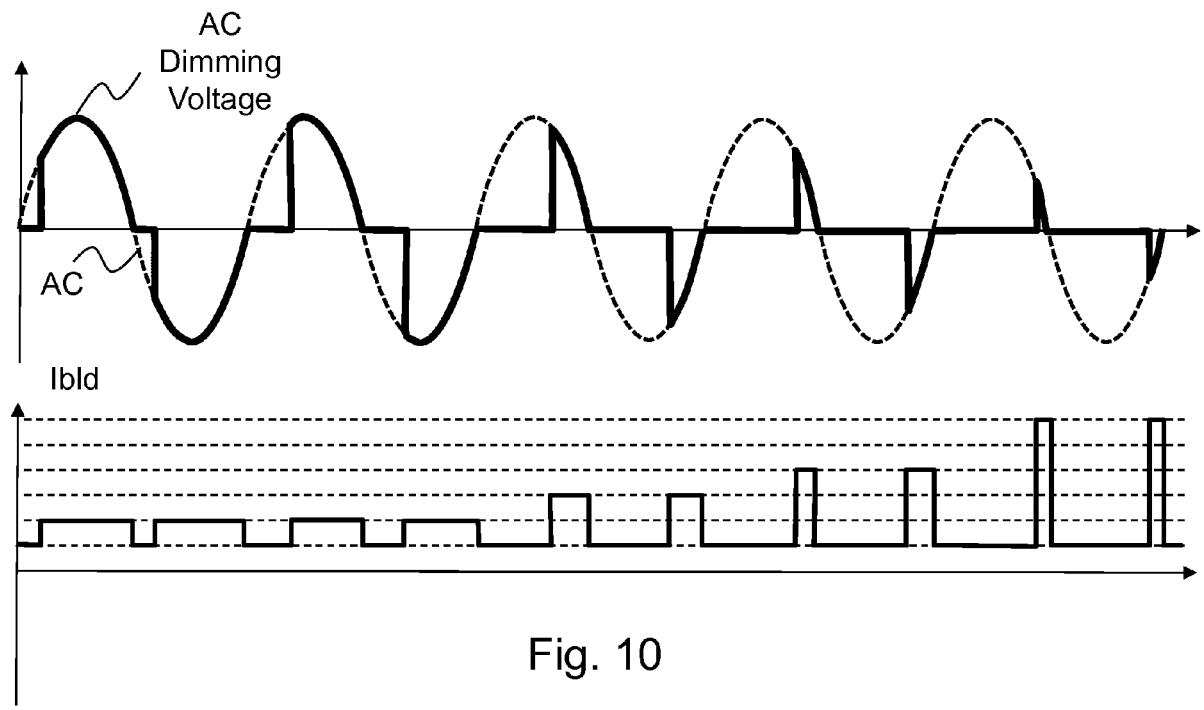
FIG. 10 shows a seventh embodiment of the present invention.

FIG. 10 shows a seventh embodiment of the present invention. This embodiment shows that the bleeder current source 285 can adjust a level of the bleeder current in the conductive phase according to the determination signal. More specifically, when the trigger phase of the AC dimming voltage is relatively later, meaning that a user intends to adjust the brightness of the light emitting device circuit 21 to be relatively lower, correspondingly, the output current Iout is relatively lower and the flicker problem is likely to occur. Hence, the bleeder current Ibld should be generated to prevent the phase-cut dimming circuit 22 from turning OFF to cause the flicker of the light emitting device circuit. According to the present invention, the determination signal Vctl is for example maintained at a fixed voltage level (or the determination signal Ictl is maintained at a fixed current level) within the conductive phase of one period, such that the bleeder current source 285 maintains conductive within the conductive phase, and keeps generating the bleeder current Ibld. Moreover, in a preferred embodiment, the bleeder current source 285 of the present invention can further adjust the level of the bleeder current Ibld in the conductive phase according to the determination signal Vctl or Ictl (that is, the level of the bleeder current Ibld can be different in different conductive phases of different periods). As shown in the figure, the level of the determination signal Vctl or Ictl may be increased as the trigger phase increases (becomes later), so as to increase the level of the bleeder current Ibld. Thus, the level of the bleeder current Ibld can be adaptively adjusted to better prevent the phase-cut dimming circuit 22 from turning OFF to cause flicker.

Figure 11:
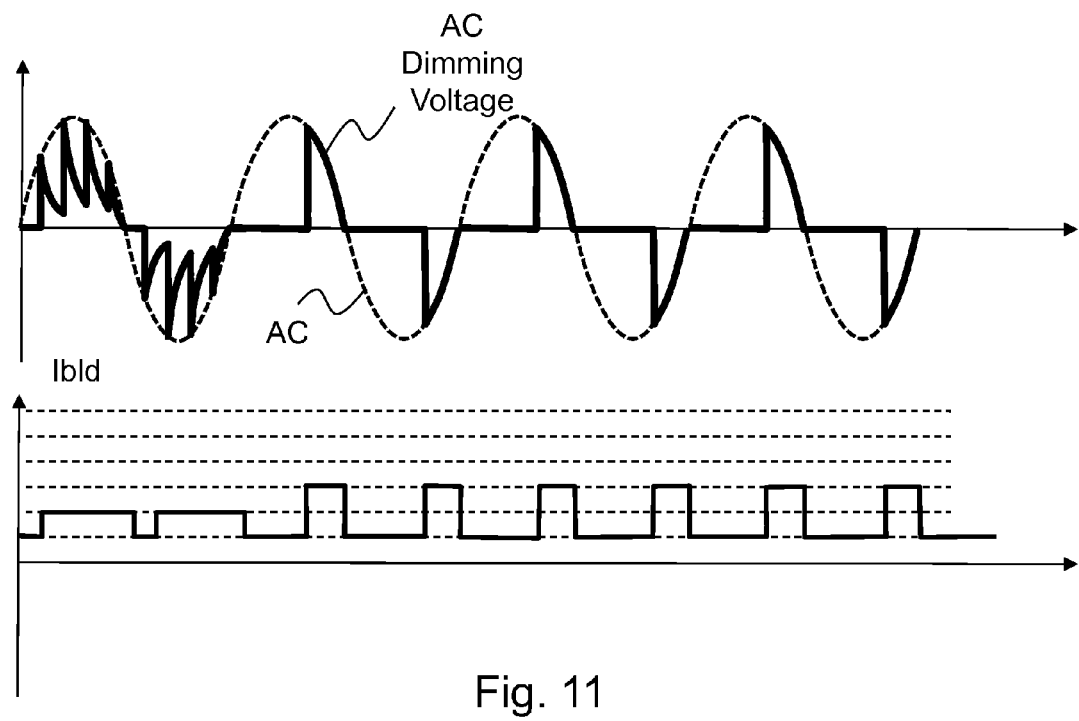
FIG. 11 shows an eighth embodiment of the present invention.

FIG. 11 shows an eighth embodiment of the present invention. This embodiment shows that the waveform analysis circuit 281 can determine that a misfire condition occurs according to the rectified dimming voltage, and generate a phase detection signal indicating the misfire condition so that the bleeder current source 285 can adjust a level of the bleeder current Ibld in the conductive phase according to the phase detection signal. More specifically, the rectified dimming voltage will present a similar waveform as the AC dimming voltage AC', and therefore the misfire condition is detectable from the waveform of the rectified dimming voltage. When the misfire condition occurs, the bleeder current Ibld is required to be generated (or increased, if it has been generated but insufficient) to prevent the light emitting device circuit 12 from flickering. According to the present invention, if a misfire condition occurs, the bleeder current control circuit 283 increases the level of the determination signal Vctl or Ictl, and the bleeder current source 285 correspondingly adjusts the level of the bleeder current Ibld in the conductive phase in a next period, as shown in the figure.

Figure 12:
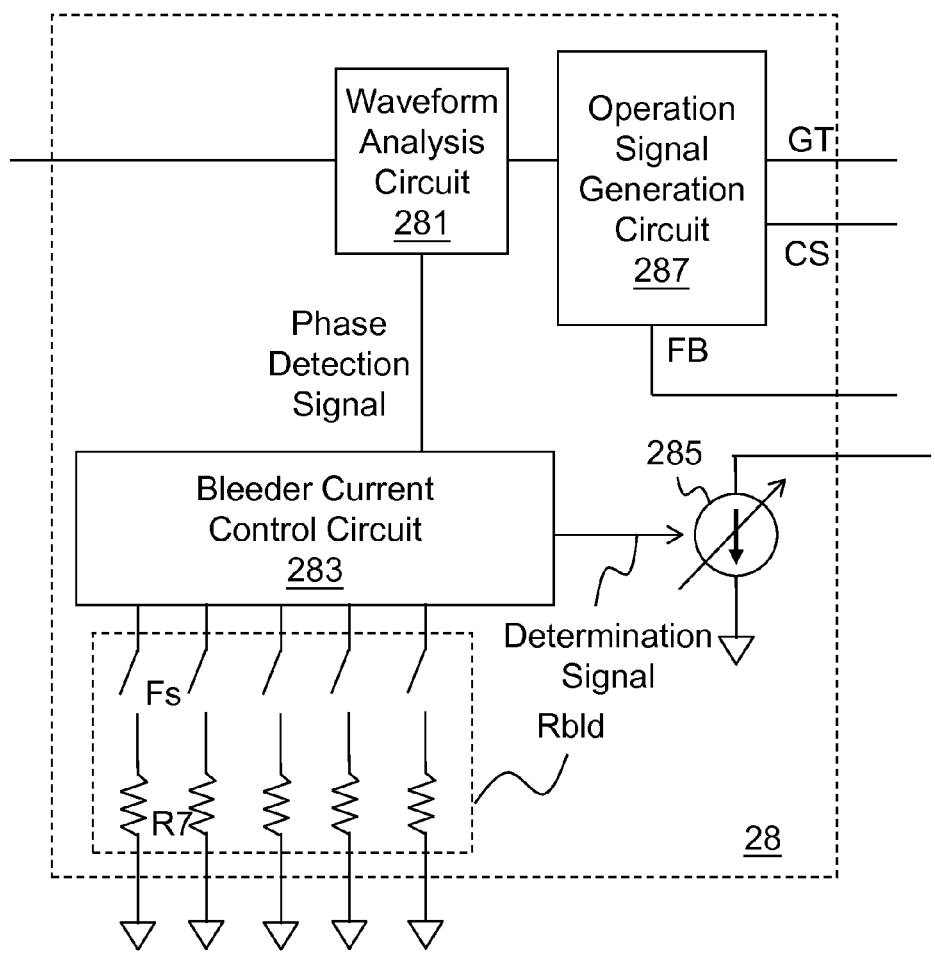
FIG. 12 shows a ninth embodiment of the present invention.

FIG. 12 shows a ninth embodiment of the present invention. This embodiment shows that the resistor Rbld may include plural strings connected in parallel, wherein each string includes a fuse switch Fs and a resistor R7. By connecting or disconnecting the fuse switches Fs, a user can determine the resistance of the resistor Rbld, so as to determine the initial bleeder current level.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between two devices shown in direction connection in the shown embodiments, such as a switch or the like, so the term "couple" should include direct and indirect connections. For another example, the light emitting device that is applicable to the present invention is not limited to the LED as shown and described in the embodiments above, but may be any current-control device. For another example, the inverted and non-inverted input terminals of an error amplifier are interchangeable, with corresponding amendments of the circuits processing these signals. In view of the foregoing, the spirit of the present invention should cover all such and other modifications and variations, which should be interpreted to fall within the scope of the following claims and their equivalents.

What is claimed is:

1. A light emitting device power supply circuit with dimming function, comprising:
   a phase-cut dimming circuit, for converting an AC voltage to an AC dimming voltage, wherein the AC dimming voltage has a non-conductive phase and a conductive phase;
   a rectifier circuit, which is coupled to the phase-cut dimming circuit, for generating a rectified dimming voltage according to the AC dimming voltage;
   a transformer circuit, which is coupled to the rectifier circuit, including:
      a primary winding, which is connected to the rectifier circuit and a power switch in series, for receiving the rectified dimming voltage, wherein a primary current flowing through the primary winding is determined according to an operation of the power switch;
      a secondary winding, which is coupled to the primary winding, for providing an output current to a light emitting device circuit according to the primary current; and
      an auxiliary winding, which is coupled to the primary winding, for generating a bleeder current to keep a conduction current flowing through the phase-cut dimming circuit to be higher than a holding current of the phase-cut dimming circuit so as to prevent the phase-cut dimming circuit from turning OFF when the phase-cut dimming circuit operates in the conductive phase; and
   a control circuit, which includes:
      a waveform analysis circuit, which is coupled to the rectifier circuit, for generating a phase detection signal according to the rectified dimming voltage;
      a bleeder current control circuit, which is coupled to the waveform analysis circuit, for generating a determination signal according to the phase detection signal, wherein the determination signal is not a pulse width modulation (PWM) signal; and
      a bleeder current source, which is coupled to the bleeder current control circuit, for controlling the bleeder current according to the determination signal so that the bleeder current is generated in a continuous and non-switching manner within the conductive phase, wherein the bleeder current source includes a linear regulator or a variable current source.

2. The light emitting device power supply circuit of claim 1, wherein the control circuit further includes an initial bleeder resistor, which is coupled to the bleeder current control circuit, for determining an initial bleeder current level.

3. The light emitting device power supply circuit of claim 1, wherein the variable current source includes a current mirror.

4. The light emitting device power supply circuit of claim 1, wherein the bleeder current is sourced from a power supply voltage of the control circuit or the auxiliary winding.

5. The light emitting device power supply circuit of claim 1, wherein the bleeder current source adjusts a level of the bleeder current in the conductive phase according to the determination signal.

6. The light emitting device power supply circuit of claim 1, wherein the waveform analysis circuit determines whether a misfire condition occurs according to the rectified dimming voltage, and the bleeder current source adjusts a level of the bleeder current in the conductive phase according to the phase detection signal.

7. A control circuit of a light emitting device power supply circuit with dimming function, wherein the light emitting device power supply circuit includes a phase-cut dimming circuit, for converting an AC voltage to an AC dimming voltage, wherein the AC dimming voltage has a non-conductive phase and a conductive phase; a rectifier circuit, which is coupled to the phase-cut dimming circuit, for generating a rectified dimming voltage according to the AC dimming voltage; a transformer circuit, which is coupled to the rectifier circuit, including: a primary winding, which is connected to the rectifier circuit and a power switch in series, for receiving the rectified dimming voltage, and determining a primary current flowing through the primary winding according to an operation of the power switch; a secondary winding, which is coupled to the primary winding, for providing an output current to a light emitting device circuit according to the primary current; and an auxiliary winding, which is coupled to the primary winding, for generating a bleeder current to keep a conduction current flowing through the phase-cut dimming circuit to be higher than a holding current of the phase-cut dimming circuit so as to prevent the phase-cut dimming circuit from turning OFF when the phase-cut dimming circuit operates in the conductive phase; the control circuit comprising:

a waveform analysis circuit, which is coupled to the rectifier circuit, for generating a phase detection signal according to the rectified dimming voltage;

a bleeder current control circuit, which is coupled to the waveform analysis circuit, for generating a determination signal according to the phase detection signal, wherein the determination signal is not a pulse width modulation (PWM) signal; and a bleeder current source, which is coupled to the bleeder current control circuit, for controlling the bleeder current according to the determination signal so that the bleeder current is generated in a continuous and non-switching manner within the conductive phase, wherein the bleeder current source includes a linear regulator or a variable current source.

8. The control circuit of claim 7, further comprising an initial bleeder resistor, which is coupled to the bleeder current control circuit, for determining an initial bleeder current level.

9. The control circuit of claim 7, wherein the variable current source includes a current mirror.

10. The control circuit of claim 7, wherein the bleeder current is sourced from a power supply voltage of the control circuit or the auxiliary winding.

11. The control circuit of claim 7, wherein the bleeder current source adjusts a level of the bleeder current in the conductive phase according to the determination signal.

12. The control circuit of claim 7, wherein the waveform analysis circuit determines whether a misfire condition occurs according to the rectified dimming voltage, and the bleeder current source adjusts a level of the bleeder current in the conductive phase according to the phase detection signal.

* * * * *